United States Patent
Jain et al.

(10) Patent No.: US 9,852,354 B2
(45) Date of Patent: Dec. 26, 2017

(54) METHOD AND APPARATUS FOR IMAGE SCORING AND ANALYSIS

(71) Applicant: DAKO Denmark A/S, Glostrup (DK)

(72) Inventors: Rohit Jain, Ventura, CA (US); Kapil Dhingra, Carpinteria, CA (US); Edward Hartford, Newbury Park, CA (US)

(73) Assignee: DAKO Denmark A/S, Glostrup (DK)

( * ) Notice: Subject to any disclaimer, the term of this patent is extended or adjusted under 35 U.S.C. 154(b) by 241 days.

(21) Appl. No.: 14/701,816

(22) Filed: May 1, 2015

(65) Prior Publication Data

US 2015/0317537 A1 Nov. 5, 2015

Related U.S. Application Data

(60) Provisional application No. 61/988,566, filed on May 5, 2014.

(51) Int. Cl.

| | |
|---|---|
| G06K 9/00 | (2006.01) |
| G06K 9/52 | (2006.01) |
| G06T 7/00 | (2017.01) |
| G06K 9/46 | (2006.01) |
| G06K 9/62 | (2006.01) |

(52) U.S. Cl.
CPC ............ *G06K 9/52* (2013.01); *G06K 9/0014* (2013.01); *G06K 9/46* (2013.01); *G06K 9/4652* (2013.01); *G06K 9/6267* (2013.01); *G06T 7/0012* (2013.01); *G06T 7/0081* (2013.01); *G06K 2009/4666* (2013.01); *G06T 2207/20144* (2013.01); *G06T 2207/30024* (2013.01)

(58) Field of Classification Search
None
See application file for complete search history.

(56) References Cited

U.S. PATENT DOCUMENTS

| | | | |
|---|---|---|---|
| 5,912,165 A | 6/1999 | Cabib et al. | |
| 7,260,248 B2 * | 8/2007 | Kaufman | A61B 5/0059 382/128 |
| 8,516,029 B1 * | 8/2013 | Koutis | G06F 17/12 708/446 |
| 8,818,030 B2 * | 8/2014 | Wang | G06K 9/2018 382/103 |
| 9,135,700 B2 * | 9/2015 | Jain | G06T 7/0012 |
| 2002/0186875 A1 | 12/2002 | Burmer et al. | |

(Continued)

OTHER PUBLICATIONS

Weiss, Y., Torralba, A., & Fergus, R. (2009). Spectral hashing. In Advances in neural information processing systems (pp. 1753-1760).*
Wan, T., Cao, J., Chen, J., & Qin, Z. (2016). Automated grading of breast cancer histopathology using cascaded ensemble with combination of multi-level image features. Neurocomputing.*

(Continued)

*Primary Examiner* — Vu Le
*Assistant Examiner* — Samah Beg

(57) ABSTRACT

Methods and apparatuses for analyzing digital pathology images are provided. The methods and apparatuses may provide estimates of staining intensity and proportion score in regions of interest within an image. Digital pathology images may be scored according to these metrics. The methods and apparatuses disclosed herein utilize various predetermined thresholds, parameters, and models to increase efficiency and permit accurate estimation of characteristics of a stained tissue sample.

19 Claims, 15 Drawing Sheets

(56) References Cited

U.S. PATENT DOCUMENTS

| | | | | |
|---|---|---|---|---|
| 2005/0002552 A1* | 1/2005 | Dunn | ............... | G01N 15/1475 |
| | | | | 382/133 |
| 2006/0127881 A1* | 6/2006 | Wong | ............... | G06K 9/00127 |
| | | | | 435/4 |
| 2011/0086773 A1* | 4/2011 | Endress | ............... | C12Q 1/6886 |
| | | | | 506/9 |
| 2012/0082366 A1* | 4/2012 | Marugame | ............... | G06T 3/00 |
| | | | | 382/133 |
| 2012/0163681 A1* | 6/2012 | Lohse | ............... | G01N 21/6428 |
| | | | | 382/128 |
| 2013/0094750 A1* | 4/2013 | Tasdizen | ............... | G06K 9/0014 |
| | | | | 382/134 |
| 2013/0301898 A1* | 11/2013 | Jain | ............... | G06T 7/0012 |
| | | | | 382/133 |
| 2014/0369587 A1* | 12/2014 | Galloway | ............... | G01N 33/5005 |
| | | | | 382/133 |
| 2015/0055844 A1* | 2/2015 | Molin | ............... | G06T 3/4053 |
| | | | | 382/131 |

OTHER PUBLICATIONS

Zhang, X., Xing, F., Su, H., Yang, L., & Zhang, S. (2015). High-throughput histopathological image analysis via robust cell segmentation and hashing.Medical image analysis, 26(1), 306-315.*

Al-Kofahi, Y., Lassoued, W., Lee, W., & Roysam, B. (2010). Improved automatic detection and segmentation of cell nuclei in histopathology images.IEEE Transactions on Biomedical Engineering, 57(4), 841-852.*

International Search Report and Written Opinion for International Application No. PCT/IB2015/001374, dated Oct. 26, 2015 (10 pages).

Thierry Pecot et al: "Non Parametric Cell Nuclei Segmentation Based on a Tracking Over Depth from 3D Fluorescence Confocal Images", Biomedical Imaging (ISBI), 2012 9th IEEE International Symposium on, IEEE, May 2, 2012, pp. 170-173.

* cited by examiner

METHOD AND APPARATUS FOR IMAGE SCORING AND ANALYSIS

RELATED APPLICATIONS

This application claims the benefit of priority under 35 U.S.C. §119(e) to U.S. Provisional Application No. 61/988,566, filed May 5, 2014.

TECHNICAL FIELD

Aspects of the present disclosure relate to the analysis and scoring of digital pathology images captured from stained tissue samples.

BACKGROUND

Conventional pathology image analysis methods utilize human labor to individually examine and label stained pathology images. This practice requires a great deal of human labor, is time consuming, and is subject to the subjectivity of the pathologist. In response to these constraints, various automated image analysis and scoring techniques have been developed.

SUMMARY OF A FEW ASPECTS OF THE DISCLOSURE

A novel and efficient method for automated scoring of ER-PR expression in a stained tissue sample is provided. The methods and techniques disclosed herein are able to estimate staining intensity and proportion score in a given region of interest and then combine these two estimates according to any standardized rule set (e.g. Allred scoring guidelines or ASCO/CAP scoring guidelines) to calculate an overall ER-PR expression score. The methods and techniques disclosed herein utilize various predetermined thresholds, parameters, and models to increase efficiency and permit accurate estimation of characteristics of a stained tissue sample.

In one embodiment consistent with the present disclosure, a method for analyzing a digital pathology image is provided. The method may include selecting at least one analysis region in the digital pathology image, separating the at least one analysis region into a tissue region and a background region using a predetermined separation threshold, and identifying a plurality of nuclear prospects within the tissue region. Identifying the plurality of nuclear prospects may include calculating a principal component projection of the tissue region, segmenting the tissue region of the digital pathology image into a plurality of image layers via a spectral hashing function, and determining the plurality of nuclear prospects from among the plurality of layers. The method may further include selecting nuclei from among the identified nuclear prospects, and generating a diagnostic score of the at least one analysis region based on the selected nuclei.

In another embodiment consistent with the present disclosure, a method for analyzing a digital pathology image may include selecting an analysis region of the digital pathology image, separating a tissue region and a background region in the analysis region of the digital pathology image using a predetermined separation threshold, identifying a plurality of nuclear prospects within the tissue region, and selecting a portion of nuclei from among the plurality of identified nuclear prospects. Selecting the portion of nuclei may include generating a hierarchical connected graph associating at least a first one of the plurality of nuclear prospects on a first segmented layer of the digital image with at least a second one of the plurality of nuclear prospects on a second segmented layer of the digital image, comparing the first one of the nuclear prospects to the second one of the nuclear prospects to identify a superior nuclear prospect, and designating the superior nuclear prospect as a selected nuclei. The method may further include generating a diagnostic score of the analysis region based on the selected nuclei.

In another embodiment consistent with the present disclosure, a system for analyzing a digital pathology image may include a non-transitory computer readable medium comprising instructions, and at least one processor configured to carry out the instructions. The at least one processor may be configured to select at least one analysis region in the digital pathology image, separate the at least one analysis region into a tissue region and a background region using a predetermined separation threshold, and identify a plurality of nuclear prospects within the tissue region. Identifying the plurality of nuclear prospects may include calculating a principal component projection of the tissue region, segmenting the tissue region of the digital pathology image into a plurality of image layers via a spectral hashing function, and determining the plurality of nuclear prospects from among the plurality of layers. The at least one processor may be further configured to select nuclei from among the identified nuclear prospects, and generate a diagnostic score of the at least one analysis region based on the selected nuclei.

DETAILED DESCRIPTION

Figure 1:
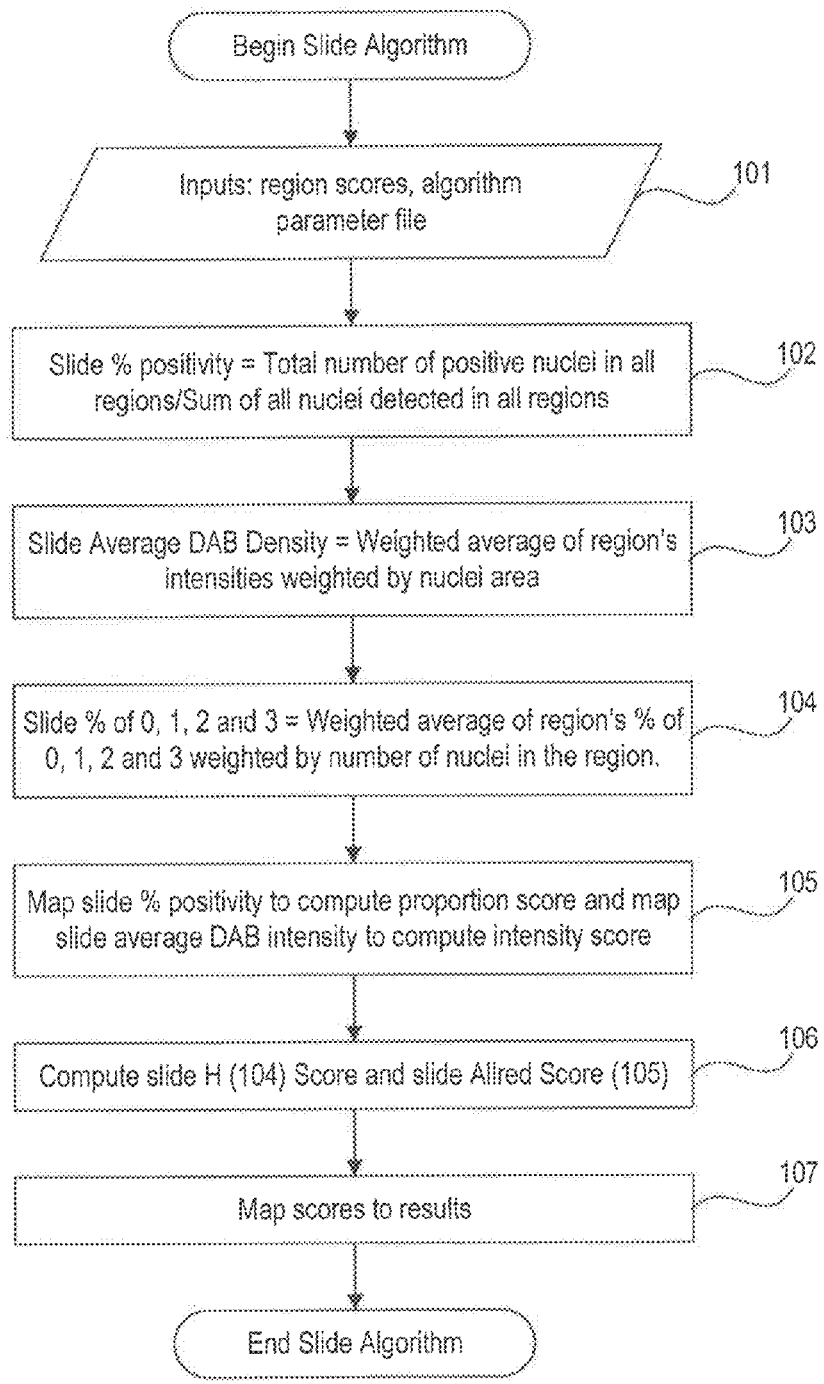
FIG. 1 is a flow chart depicting the steps in an exemplary method for computing a staining expression score of a digital pathology slide.

Digitized pathology images for analysis are created from tissue samples stained with different methods for different diagnosing purposes, such as H&E (hematoxylin and eosin) and IHC (immunohistochemical) staining. Both of these staining methods are widely used in pathology, and are common for use in biopsy of suspected cancerous tissue. In one technique, diaminobenzadine (DAB) a chromogenic substrate of horse radish peroxidase (HRP) may be used for visualizing target proteins in tissue samples which have been labeled with peroxidase activity. Samples are frequently counterstained, for example with hematoxylin, to provide visual contrast. The method may serve to identify target proteins, such as Estrogen and Progesterone Receptor (ER-PR), a protein associated with cancerous breast tissue. Identifying and assessing the prevalence of target proteins within a tissue sample may aid in the diagnosis and treatment of various medical conditions. In the case of ER-PR, identification may assist in the diagnosis and treatment of breast cancer.

When used to identify ER-PR, DAB staining results in nuclear staining patterns. Interpreting or diagnosing the results of a stained tissue sample involves assessing the intensity of cell nucleus staining and the proportion of stained cell nuclei to non-stained. More intense nucleus staining and a higher proportion of stained nuclei are associated with a higher occurrence of ER-PR proteins. Guidelines for translating intensity of cell staining and proportion score into clinical diagnoses are published by the American Society of Clinical Oncology and the College of American Pathologists (e.g., ASCO/CAP guidelines) as well as by the makers of various staining kits and protocols (e.g. Allred ER-PR guidelines). Different staining kits and protocols, such as the Dako ER-PR kit, may produce different visual results due to differing chemical composition and protocol steps, and guidelines tailored to the particular kit and protocol may be necessary.

Assessing the intensity and proportion score of tissue staining may be performed manually, by a pathologist visually observing each image and providing scores for each assessment. A pathologist may be assisted by various digital imaging technologies to allow for manipulation of digital images. Additionally, automated analysis and scoring methods exist for determining intensity and proportion score of tissue staining. Conventional automated analysis and scoring methods may be based on conventional image analysis techniques, such as feature extraction and object recognition. These techniques, although faster than manual techniques performed by a pathologist, may be resource intensive and time consuming. Both manual and automatic methods of analysis may include steps for nucleus identification. In order to increase the efficiency and accuracy of pathology laboratory operations, methods to reduce the resource intensiveness of digital pathology analysis and scoring may be useful.

Reference will now be made in detail to exemplary embodiments with reference to the accompanying drawings. Wherever possible, the same reference numbers will be used throughout the drawings and the following description to refer to the same or like parts. These embodiments are described in sufficient detail to enable those skilled in the art to practice the invention and it is to be understood that other embodiments may be utilized and that changes may be made without departing from the scope of the present invention. The following detailed description, therefore, is not to be interpreted in a limiting sense.

Unless otherwise defined, all technical and/or scientific terms used herein have the same meaning as commonly understood by one of ordinary skill in the art to which the embodiments of the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Exemplary disclosed embodiments may include devices and methods for analyzing digital pathology images. Digital pathology images may include images of tissue samples obtained through any suitable imaging means, including, for example, digital microscopy and digital slide scanning. Digital pathology images may also be obtained from digital storage databases. Analysis techniques implemented by disclosed methods and devices may be suitable for assessing ER-PR expression in obtained tissue samples. Disclosed methods and devices may be used to estimate staining intensity and proportion score in a selected region of interest. These estimates may be used according to standardized or customized rule sets to calculate an overall ER-PR expression score for a selected region. Multiple selected regions may be used to generate an overall ER-PR expression score for an entire digital pathology image, or an entire tissue sample.

FIG. 1 is a flow chart depicting the steps in a method for computing a staining expression score a digital pathology slide. Slide analysis method 100 may receive outputs from regional analysis method 200 at input step 101. Regional analysis method may be understood as follows, with reference to FIG. 2.

Figure 2:
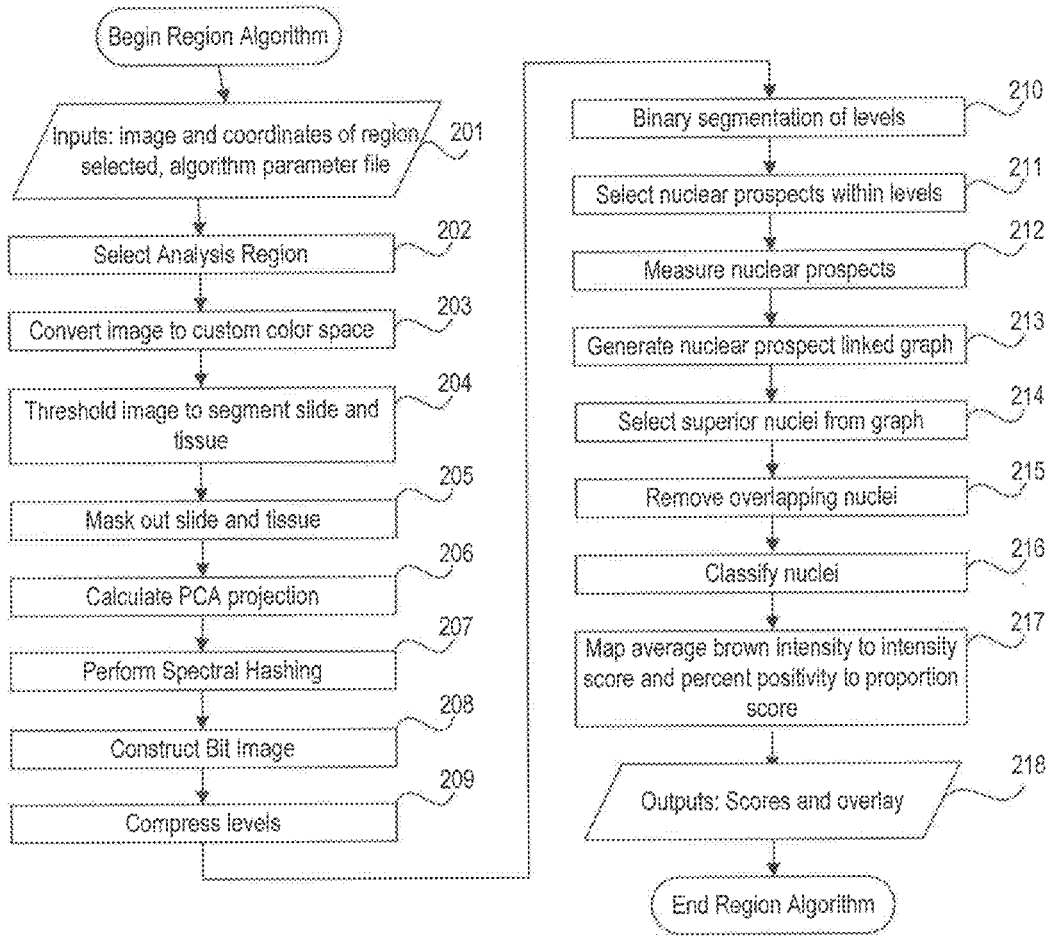
FIG. 2 is a flow chart depicting the steps in an exemplary method for computing a staining expression score of a selected region of a digital pathology image.

FIG. 2 is a flow chart depicting the steps in a method for computing an ER-PR expression score of a selected region of a digital pathology image. The steps of the method shown will be now be explained with further reference to FIGS. 3-16. Steps 202-217 of flowchart 200 may be subdivided into four general groups. First, masking steps 202-205 serve to reduce the amount of image data to be processed by automatically selecting only image regions containing tissue for further analysis. Second, nucleus prospect identification steps 206-211 begin the nuclear identification process through image segmentation and initial blob recognition techniques. Third, nucleus selection steps 212-215 finalize the nucleus identification by performing multi-segmented analysis of the identified nucleus prospects. Finally, nucleus scoring steps 216-217 assess the identified nuclei for scoring. The disclosed method may receive as an input, at step 201, an obtained digital pathology image. In an exemplary embodiment, a digital pathology image may be obtained by capturing an image of a biological tissue specimen through any suitable means, including digital microscopy and digital slide scanning. In another exemplary embodiment, a digital pathology image may also be obtained from a digital storage database.

Throughout the description of the apparatus and methods of the disclosure, references may be made to specific exemplary illustrative images. It should be understood that the image processing methods disclosed do not require the actual display of the illustrative images. Because the images may be digitally represented, they may be also be digitally manipulated and analyzed without display. As used herein, the term digital image may refer to data that, when processed by a suitable display means, provides a visual representation. Digital pathology images illustrated by the figures of this disclosure are shown in greyscale. However, as discussed below, some figures may represent color images. Furthermore, the steps disclosed herein are described in a particular order and in particular combinations for exemplary and explanatory purposes only. While some steps may require the results of others, a person of skill in the art will recognize that some steps may be performed in a different order or in combination with other steps without compromising the results.

An exemplary digital pathology image may include color information for each pixel of the image. The color information may be stored as multiple channel values in a color space. Each channel value may specify a level of a pixel component, for example, color or luminosity, in a single channel of the color space. The color space may include one or more channels. An exemplary grayscale image may include a single channel specifying a gray level between white and black for each pixel. Exemplary color images may include three channels. Examples of three channel color spaces include, red, green and blue color channels in an RGB color space, and luma, blue-difference, and red-difference in a Y'CbCr color space. Exemplary embodiments of the methods and techniques disclosed include images with color information stored in a single channel grayscale color space, images with color information stored in an RGB color space, images with color information stored in a Y'CbCr color space, as well as images with color information stored in custom color spaces. The color spaces described with respect to specific embodiments herein are exemplary only, and a person of skill in the art will recognize that the methods and techniques disclosed herein may also be generalized to work with other color spaces, in any number of channels, including, for instance RGB, HSI (Hue-Saturation-Intensity), YCbCr (luminance, blue difference, red difference), and any other suitable color spaces either known in the art or custom created. Suitable digital pathology images may also include channels containing non-color data, such as temperature and roughness. For exemplary purposes only, embodiments disclosed herein are discussed with respect to a data space having three color channels, similar to the Y'-Cb—Cr color space. The techniques and methods discussed herein are not, however, limited by the choice of data space. Alternative data spaces, having any number of channels containing color information or other data may similarly be utilized in conjunction with the methods and techniques discussed herein without departing from the scope of the invention.

Figure 3:
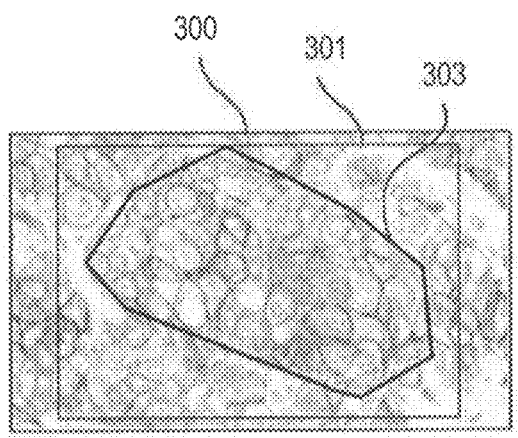
FIG. 3. illustrates the selection of an analysis region within a digital pathology image.

At step 202, the first of masking steps 202-205 in FIG. 2, an analysis region 301 in the digital pathology image 300 is selected. FIG. 3. illustrates the selection of an analysis region within digital pathology image 300. A selected region of interest i.e. analysis region, may be rectangular, such as illustrated analysis region 301 and may be a region of any desired shape, for example, an irregular polygon as illustrated by analysis region 303. An analysis region may be drawn by a user or operator, e.g. a pathologist, in a shape suitable to include cell types or tissue type to be scored, e.g. tumor cells within the analysis region 301, 303 and to exclude other cell types e.g. connective tissue, normal stromal cells, non-cancerous cells, and so forth, as being outside the region of interest and therefore not included in the analysis. As described above, in some embodiments, a selected analysis region may include the entirety of a digital slide image. In such embodiments, analysis region selection step 202 may be omitted entirely.

For exemplary purposes only, methods and techniques described herein refer to analysis performed on analysis region 301. The methods described may be equally applied to alternatively shaped analysis regions, such as polygonal analysis region 303. Analysis region 301 may be selected to improve efficiency of the analysis method, permitting smaller parts of a larger image to be analyzed separately. Analysis region 301 may be selected based on specific areas of interest of the digital pathology image 300, as determined by an operator or an image processing system. Analysis region 301 may be selected by an operator, may be determined by an image processing system based on image characteristics, and may be determined by an operator working in coordination with an image processing system. An operator, such as a pathologist, may select analysis region 301 based only on the image itself, relying on the operator's experience to determine an appropriate region. Analysis region 301 may also be selected automatically by an image processing system. Automatic selection may be performed, for example, to ensure that an entire digital image is analyzed region by region. Automatic selection may also be performed based on image characteristics determined during pre-analysis computations to determine areas of interest, such as potential tumor areas. Analysis region 301 may also be selected by an operator working in coordination with an image processing system. An image processing system may suggest areas of interest to an operator based on pre-analysis computations. The operator may then confirm, deny, and modify suggestions made by the image processing system. Further, the image processing system may, through machine learning techniques, use the operator's modifications to improve future suggestions. In an alternative embodiment, an operator may select an analysis region 301 and an image processing system may provide feedback to the operator, based on pre-analysis computations, on the quality of the operator's selection.

Image coordinates defining analysis region 301 may serve as input to color space conversion step 203 in FIG. 2. Additionally, step 203 may receive additional inputs, including, for example, image scanner and staining specific thresholds, feature size thresholds, mappings for intensity transformations, rules for scoring and interpretation, scanning parameters, staining parameters, sensing parameters for additional sensing modalities, and other method parameters required by the step 203 and the following steps.

Figure 4:
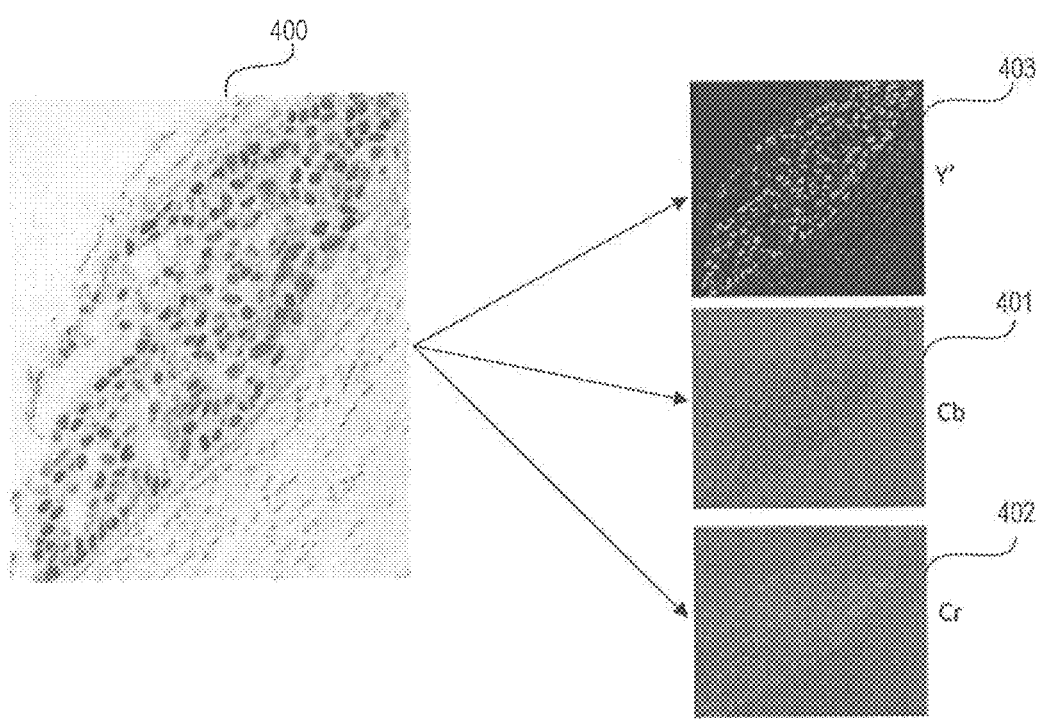
FIG. 4 illustrates an exemplary color space conversion.

FIG. 4 illustrates an exemplary color space conversion step 203. Digital pathology image 400 represents image analysis region 301 selected in step 202. As obtained from the previous step, digital pathology image 400 may include color information stored in an 8-bit (i.e. 256 values per channel) RGB color space. The color information of digital pathology image 400 may be converted into color information stored in a Y'CbCr space according to the following equations.

$$Y'=+(0.299 \cdot R'_D)+(0.587 \cdot G''_D)+(0.114 \cdot B'_D)$$

$$C'_B=128-(0.168736 \cdot R'_D)-(0.331264 \cdot G'_D)+(0.5 \cdot B'_D)$$

$$C'R=128+(0.5 \cdot R'_D)-(0.4186688 \cdot G'_D)-0.081312 \cdot B'_D)$$

In some embodiments consistent with the present disclosure, a three channel color space similar to the Y'CbCr space may be used, wherein custom values for the constants in the above equations are computed through data analysis to improve the accuracy and efficiency of the methods and techniques described herein. The following description refers to the channels of a Y'CbCr color space for exemplary purposes only.

As illustrated in FIG. 4, each channel of the three channel color space may be represented by a single channel grayscale image. Thus, digital pathology image 400 may be divided into Y' channel image 403 representative of a first channel value of pixels throughout the original image 400, Cb channel image 401 representative of a second channel value of pixels throughout the original image 400, and Cr channel image 402 representative of a third channel value of pixels through the original image 400.

As disclosed above, although the exemplary embodiments described herein utilize conversion from an RGB to analytically relevant transformed color space, the methods described may be generalized to any known or custom color space, and further generalized to data spaces containing non-color data channels. For datasets with more than three channels, PCA (principal components analysis) or similar techniques, including supervised learning methods, could be used on a large representative dataset to design spatial transformations for maximum discriminatory relevance.

In some embodiments consistent with the disclosure, analysis region 301 may be separated into a tissue region and a background regions using a predetermined separation threshold 510. This separation may be understood with respect to FIGS. 5 and 6.

Figure 5:
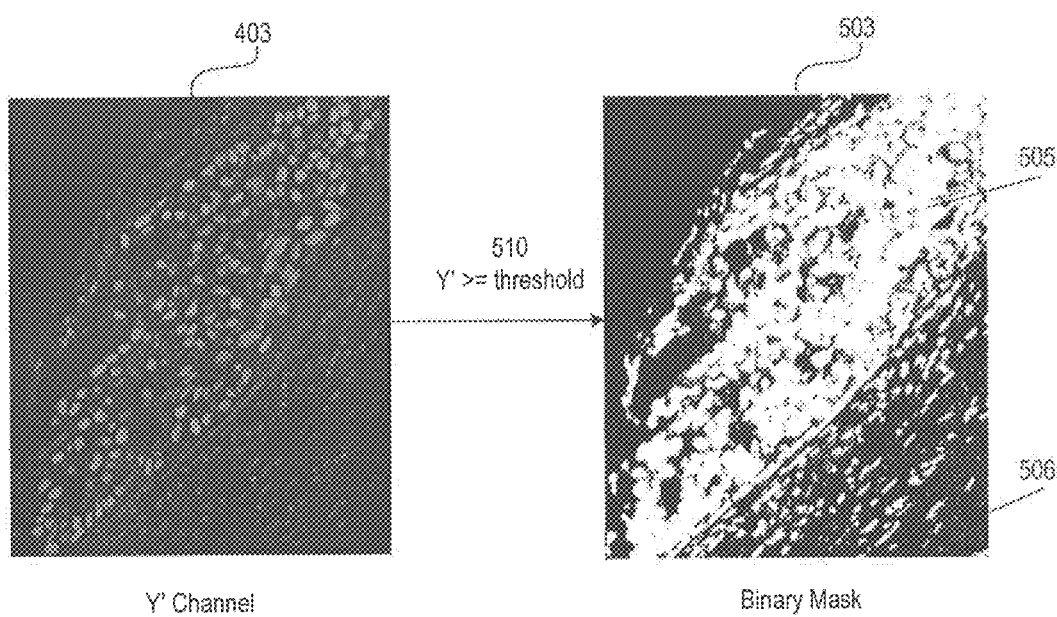
FIG. 5 illustrates an exemplary thresholding step for a single channel image to separate specific image areas.

FIG. 5 illustrates a step 204 for thresholding a single channel image to separate specific image areas. In the exemplary embodiment illustrated, Y' channel image 403, representing a single channel of analysis region 301, is converted into a binary mask 503 based on separation threshold value 510 in order to separate analysis region 301 into a tissue region 505 and a background region 506. A background region may represent any area not of interest for further analysis. In the exemplary embodiment illustrated, background region 506 represents non-tissue slide areas.

In an exemplary embodiment, binarizing Y' channel image 403 into binary mask 503 may be performed by converting each pixel of the image into either a white pixel representing tissue area when a pixel value in the Y' channel is less than an separation threshold value 510 or a black pixel representing a background region when a pixel value in the Y' channel is greater than the separation threshold value 510. The black and white pixels illustrated in FIG. 5 are just one way of representing binary mask 503, and any other binary representation may also be used. Similarly, binarization may be performed on non-color data channels by comparison to a non-color separation threshold value 510.

The single channel separation threshold value 510 for determining inclusion in a tissue region or a background may be predetermined. A predetermined separation threshold 510 may be determined specifically for use with a particular staining kit and protocol. A predetermined separation threshold 510 may be computed by running multiple clustering algorithms on a large set of analysis regions taken from multiple slides stained with the kit and protocol and showing a large color range of tissue staining expression. The results of the multiple clustering algorithms may then be analyzed in multiple color spaces to determine a specific separation threshold value 510. Determining a separation threshold value 510 may be computationally intensive; predetermining a separation threshold value 510 may thus permit increased speed in the performance of the image analysis method. Predetermined separation threshold values may be limited to usage with the particular staining kit and protocol for which they are determined. Different staining kits and protocols may require the determination of different separation threshold values. Similarly, supervised learning and other appropriate techniques may be used to select an appropriate threshold value or separation algorithm.

Figure 6:
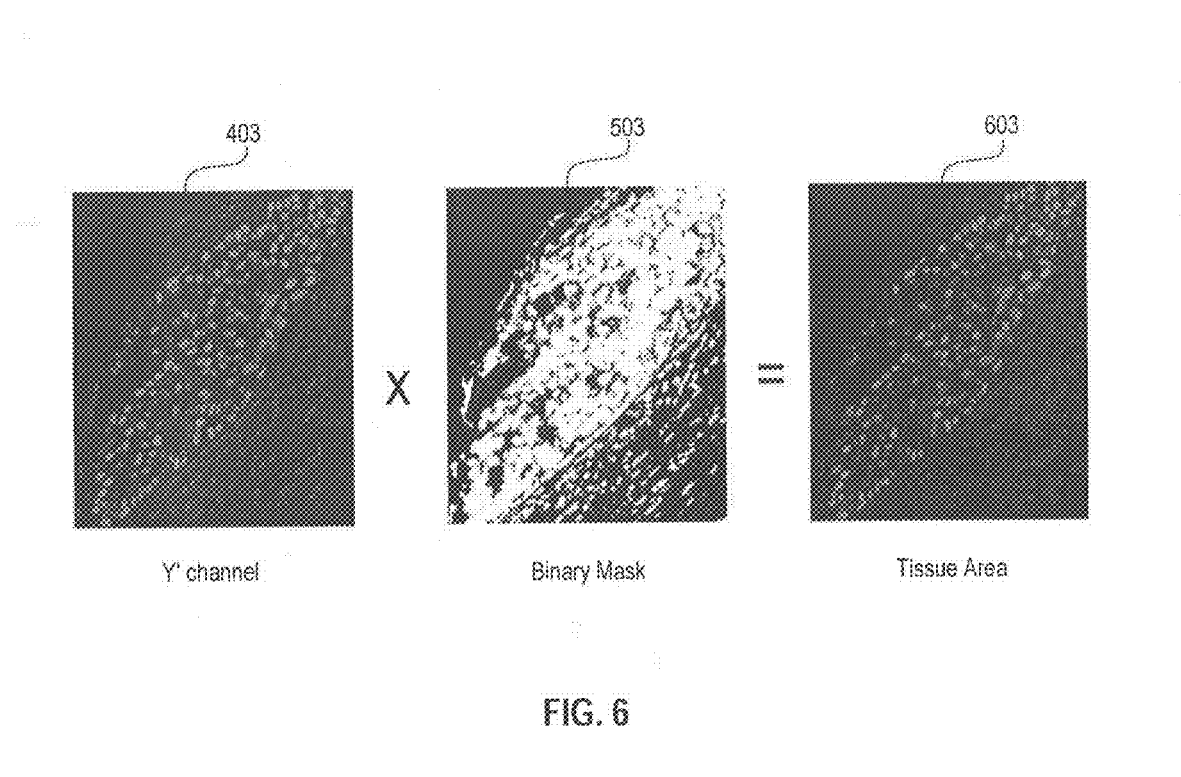
FIG. 6 illustrates an exemplary use of a binary mask to separate regions within an image.

FIG. 6 illustrates the use of a binary mask to separate regions within an image. Referring again to FIG. 2, separation step 205 may be performed to separate tissue areas from non-tissue background areas in each of Cb channel image 401, Cr channel image 402, and Y' channel image 403. In the exemplary embodiment illustrated in FIG. 6, binary mask 503, created from the Y' channel image 403 using a predetermined threshold 510, is used to separate a tissue region from a background region in Y' channel image 403 to produce Y' channel tissue image 603. Binary mask 503 may be inverted and applied to Y' channel image 403 to remove any portions of the image that correspond to a background region, for example, a slide area. The value of each pixel of Y' channel image 403 corresponding to black pixels of binary mask 503, i.e. pixels having an intensity value lower than the predetermined separation threshold 510, may be converted to a single value signifying background tissue. For example, any pixel value that does not meet the predetermined separation threshold 510 may be converted into a black pixel. The method as illustrated in FIG. 6 may be applied at separation step 205 to Cb channel image 401 and Cr channel image 402 to separate tissue from background regions to produce Cb channel tissue image 601 and Cr channel tissue image 602. Y' channel tissue image 603, Cb channel tissue image 601, and Cr channel tissue image 602 may also be combined into composite tissue image 604 (not shown). The tissue images resulting from the separation step may further be used as inputs to steps to be performed later in the method, either separately, or in combination as composite tissue image 604. With respect to each channel, separation step 205 may be performed at any time during the scoring method prior to the use of that channel's tissue image.

For exemplary illustrative purposes, steps 204 and 205 have been described as multiple steps. These steps may, however, be combined into a single step wherein each pixel of Y' channel image 403 is compared to a predetermined separation threshold 510. If the pixel exceeds the threshold 510, it and corresponding pixels in Cb channel image 401 and Cr channel image 402 may be left alone. If the pixel of Y' channel image 403 does not exceed the threshold 510, it and corresponding pixels in Cb channel image 401 and Cr channel image 402 may be converted to a value signifying background tissue.

In exemplary disclosed embodiments, the Y' channel of a Y'CbCr color space may be used to separate regions within digital pathology image 400 because the Y' channel represents the luma, or color independent brightness, of the pixel. Thus, no matter the actual color of the pixel, the Y' channel captures an intensity of the pixel. In alternative embodiments, other measures may be used for determining a separation threshold for the step of separating regions within digital pathology image 400. Techniques disclosed herein are not limited to either the use of a Y' channel for a separation threshold or to the use of an intensity value for a separation threshold. Values of any other single channel may be used, for example the Cb and Cr values in a Y'CbCr color space, or the R, G, and B values in an RGB color space. Color independent intensity values in a different color space may be used, for example the intensity value in an HIS color space. Furthermore, combinations of channel values may be used, for example, a combination of the R, G, and B values in an RGB color space. The use of different color spaces and/or different data spaces may require the generation of different predetermined separation thresholds.

Steps 202-205, wherein a slide region is selected and subjected to procedures to eliminate or mask out non-tissue regions, may serve to reduce the amount of image data transferred to nuclear prospect identification steps 206-211. Exemplary embodiments discussed herein utilize a Y' channel for both thresholding and background region separation steps 204, 205 and for the succeeding steps 206-216. However, it is not necessary that these steps be performed utilizing the same channel, or even the same color space. Any suitable color spaces or channels known in the art may be utilized to perform these various steps. In some exemplary embodiments, thresholding and separation performed in steps 204 and 205 may be excluded, and further analysis performed on the entirety of the analysis region.

Figure 7:
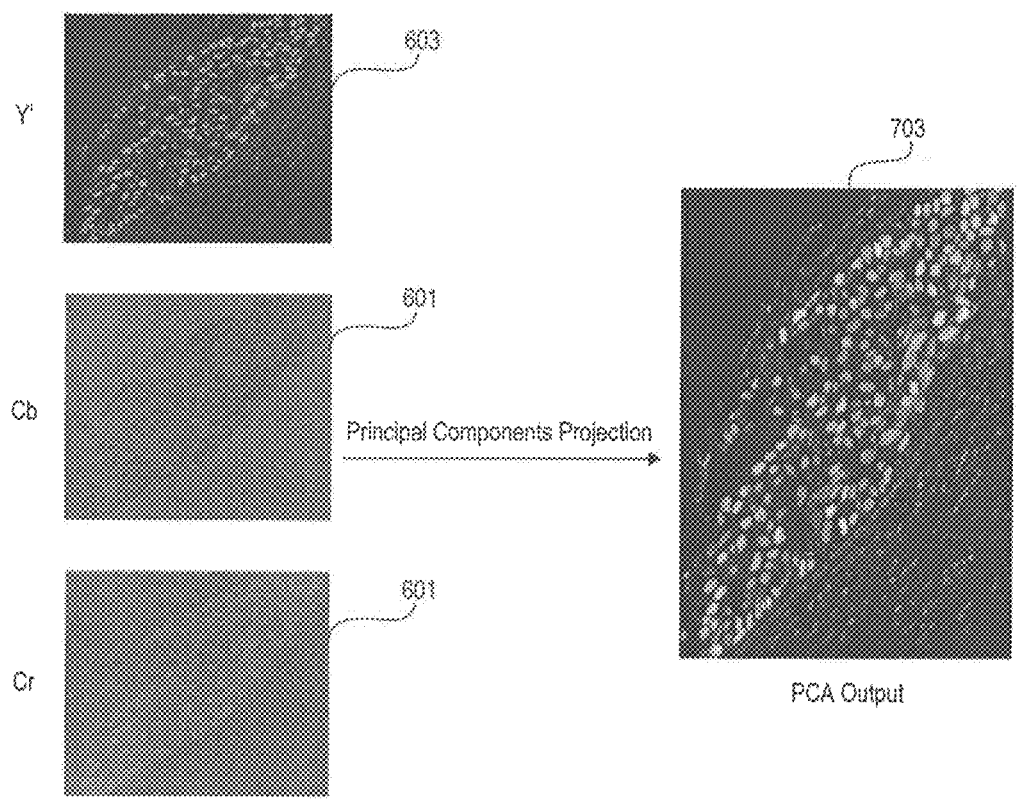
FIG. 7 illustrates an exemplary principal components projection step.

Returning to FIG. 2, principal component projection step 206 may be performed on Y' channel tissue image 603, Cb channel tissue image 601, and Cr channel tissue image 602 to produce projected image 703. FIG. 7 illustrates projected image 703, computed from the principal projection of Y' channel tissue image 603, Cb channel tissue image 601 and Cr channel tissue image 602. In principal component projection, the information contained in the pixels of Y' image 603, Cb image 601, and Cr image 602 is used to generate a new principal component data space. When the pixels of the composite image comprising Y' image 603, Cb image 601, and Cr image 602, in the Y'-Cb—Cr color space, are orthogonally transformed into the principal component data space, each data channel is independent of and orthogonal to the other data channels in the principal component data space. After such a transformation, each data channel in the principal component data space contains information that is linearly uncorrelated, i.e. orthogonal, from the data in each of the other channels of the space. The principal components thus obtained in the image 703 may then be utilized in succeeding steps.

Returning to FIG. 2, spectral hashing step 207 may be performed to segment composite tissue image 604. A predetermined hash function, for example, a trigonometric function, may be applied to the components of each pixel of projected image 703. The hash function may be selected in order to produce an output having a predetermined number of bits. For example, a 5 bit hash function, when applied to the pixels of projected image 703 may serve to hash each three-component pixel into one of 32, e.g. 2"5, or 5 bits, possible outputs. Each of the 32 possible outputs may correspond to one of a plurality of hash segments. Each hash segment may be a data array having the same x and y dimensions as projected image 703. In an embodiment used for exemplary discussion purposes, there may be 32 hash segments, each corresponding to one of the possible outputs of the spectral hashing function. The components of each pixel of projected image 703 may be hashed, with the resultant output of the spectral hashing function determining which of the 32 hash segments each pixel should be assigned to. The assignment of a pixel from projected image 703 to a particular hash segment may involve simply changing the corresponding array position of the appropriate hash segment from zero to one.

The assignment of a pixel from projected image 703 to a particular hash segment may also involve storing all data components for each pixel, from composite tissue image 604, projected image 703, or both. Assignment of a pixel may also include, for example, adding an additional data channel to projected image 703 or composite tissue image 604, the additional data channel including the output of the spectral hashing function for each pixel. In this fashion all of the hash segments may be stored with projected image 703 or composite tissue image 604. Alternative assignment methods may result in variations in the steps to follow. A person of skill in the art will recognize that several possibilities exist for storing and processing the output data of the spectral hashing function. The methods of storage and data structures described herein are for exemplary purposes, and are not intended to limit the scope of the disclosure.

Each of the pixels of projected image 703 may thus be assigned to one hash segment, based on the output of the hash function when applied to the components of the pixels. Binary pixel values in each hash segment represent the inclusion of each of the pixels of projected image 703 that produce a spectral hashing function output corresponding to that of the appropriate hash segment. Some hash segments may be empty; that is, one or more of the potential hash function outputs may have no corresponding pixels.

Spectral hashing may thus serve to segregate groups of pixels from projected image 703 based on the result obtained when the components of each pixel are acted on by a hash function. In the example above, a 5 bit hash function having 32 possible outputs is discussed. The methods and techniques, however, may apply to hash functions having more or fewer possible outputs. The number of possible hash function outputs, or segments, may be predetermined based on analysis of image data. Additionally, for exemplary purposes, the methods described above describe the hashing of each pixel of projected image 703. However, the methods and techniques described herein may also be carried out on only a portion of the pixels of projected image 703. A portion, for example, may be selected to exclude the pixels set to zero during masking step 205.

Returning now to FIG. 2, bit image construction step 208 may be performed to generate bit image 801 (not shown). First, the hash segments may be sorted based on average intensity level. The average intensity level for each hash segment may be determined by applying that hash segment to composite tissue image 604 as a mask. Because the hash segments each comprise binary pixel values, they may function as masks. Each hash segment may be applied as a mask to composite tissue image 604. For each masked composite tissue image 604, the mean Y' value of all unmasked pixels may be computed. Then, the hash segments may be sorted based on this average intensity level. As discussed above, some number of hash segments may be entirely blank. Blank hash segments may be sorted as having minimum levels of average intensity. Once sorted, a grayscale value may be assigned to each hash segment, with the brightest grayscale value being assigned to the hash segment having the highest average intensity and the darkest grayscale value being assigned to the hash segment having the lowest average intensity. Finally, the hash segments may be combined to construct bit image 801.

Figure 8:
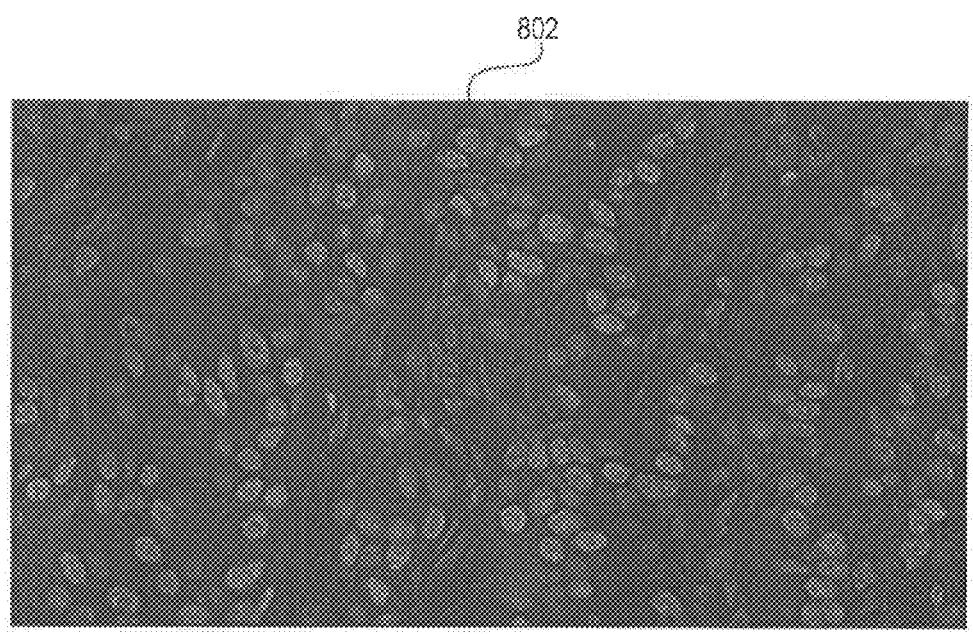
FIG. 8 illustrates an exemplary bit image generated by a spectral hashing step.

Constructed thusly, bit image 801 may be a grayscale image, wherein the grayscale value of each pixel corresponds to the grayscale value assigned to the hash segment to which that pixel was assigned, based on the spectral hashing output of the corresponding pixel of projected image 703. Bit image 801 may comprise any suitable number of hashing levels. In some embodiments, bit image 801 may be a 5-bit grayscale image having 32 levels. Bit image 801 may therefore represent all of the data generated during the spectral hashing process. Bit image 802, illustrated in FIG. 8, represents an exemplary bit image including 10 hashing levels produced by a spectral hashing process similar to that used to produce bit image 801.

After generation of bit image 801, level compression step 209 may compress bit image 801 into compressed bit image 901. Compression step 209 may compress bit image 801 according to a predetermined scheme, including either data reduction or data consolidation components, or both. A predetermined compression scheme may be based on analysis conducted on image training data. In an exemplary predetermined scheme, level compression begins at the level with the highest average intensity.

A consolidation factor may be predetermined based on image analysis of training data. Beginning with levels of highest average intensity, consecutive levels of sorted bit image 801 may be combined. The number of combined consecutive levels may correspond to the predetermined consolidation factor. In an exemplary embodiment discussed here, the levels of bit image 801 may be consolidated by a factor of two, combining, for example, the levels one and two, then levels three and four, etc. Multiple levels of bit image 801 may be combined by assigning each pixel of the multiple levels the same grayscale value. This consolidation results in a consolidated level including all positive pixels from each of the levels consolidated.

Consolidation may be repeated on successive levels until a predetermined level limit is reached. For example, if a level limit is predetermined to be eight, then level consolidation may progress until eight consolidated levels are generated. In such a case, if a consolidation factor is two, then the first sixteen levels of bit image 801 will be combined into eight consolidated levels when the level limit is reached. After the level limit is reached, all subsequent levels of bit image 801 may be eliminated in a data reduction component of level compression step 209. Levels may be eliminated by setting each pixel in a given level (i.e., having a grayscale value corresponding to that level) to zero. The eliminated levels of bit image 801 may include any blank levels. The remaining consolidated levels of bit image 801 may comprise compressed bit image 901.

In the embodiment discussed above, spectral hashing is performed to produce a 5-bit, or 32 level output. Level compression step 209 compresses the data by consolidating pairs of consecutive images and eliminating half of the original levels, resulting in a compressed bit image 901 having eight levels. These values are exemplary only, and suitable values for hash function output levels, level consolidation factor, and level limit may differ from these without departing from the scope of the disclosure. Suitable values for these parameters may be predetermined based on analysis of image training data, may be automatically determined during processing based on image characteristics, and may be manually determined prior to or during processing based on performance and output concerns.

Figure 9:
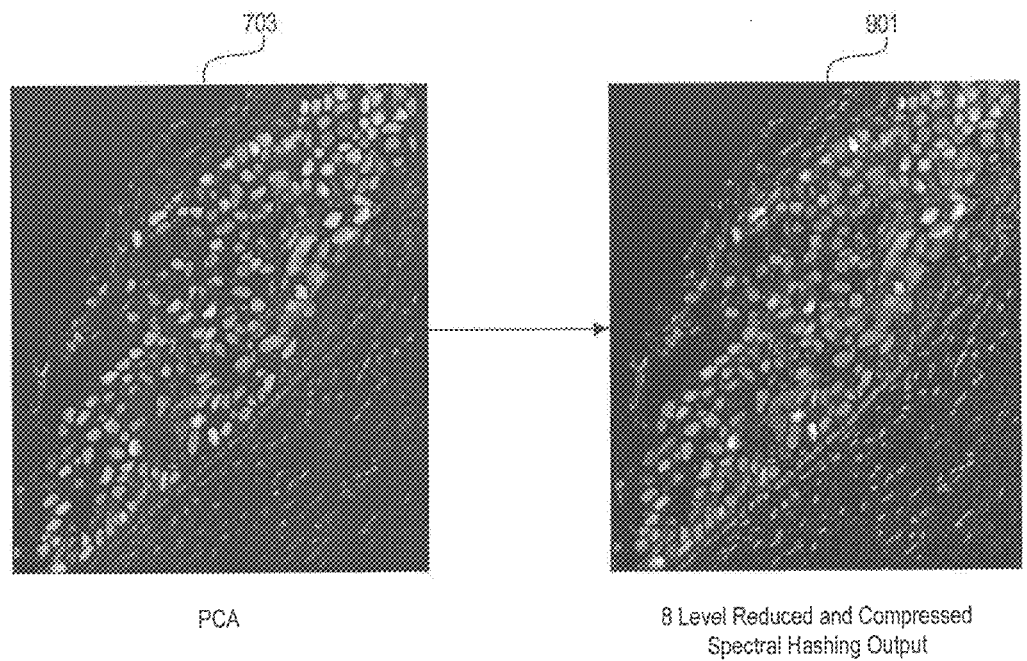
FIG. 9 illustrates an exemplary level compression step.

FIG. 9 illustrates the results of steps 207-209 as performed on projected image 703. Compressed bit image 901 is displayed. As discussed above, compressed bit image 901 includes pixels having 8 different grayscale levels corresponding to the spectral hashing results of spectral hashing step 207. Compressed bit image 901 may be used as input to binary segmentation step 210.

Figure 10:
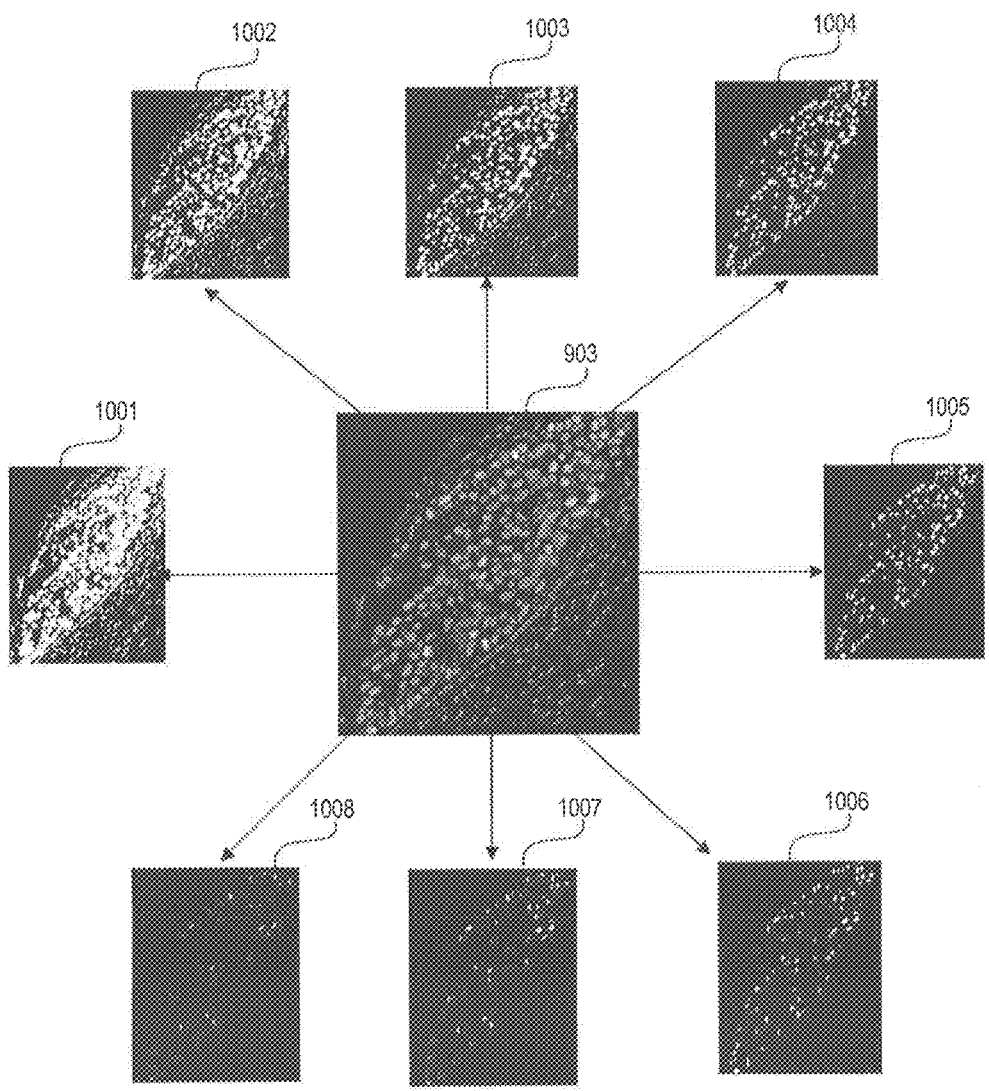
FIG. 10 illustrates an exemplary binary segmentation step.

Returning again to FIG. 2, binary segmentation step 210 may be performed based on compressed bit image 901. FIG. 10 illustrates an exemplary binary segmentation step 210 performed on compressed bit image 901. For each level (i.e. grayscale value) of compressed bit image 901, all pixels from that level, or having that grayscale value are copied to a new image in which pixels having value equal to level are assigned a maximum value (foreground), while the remainder of the pixels are assigned a minimum value (background). Binary segmentation step 210 produces a number of binary segment images corresponding to the number of levels of compressed bit image 901. In the exemplary embodiment used herein for discussion, 8 binary segment images 1001-1008 are generated. As shown in FIG. 10, binary segment image 1001 represents the lowest, i.e. darkest, grayscale level of compressed bit image 901. Binary segment image 1001 appears brighter than the other binary segment images because more pixels were assigned to this level than any other level. Binary segment image 1008 represents the highest, i.e. brightest, grayscale level of compressed bit image 901, having the fewest assigned pixels.

Figure 11:
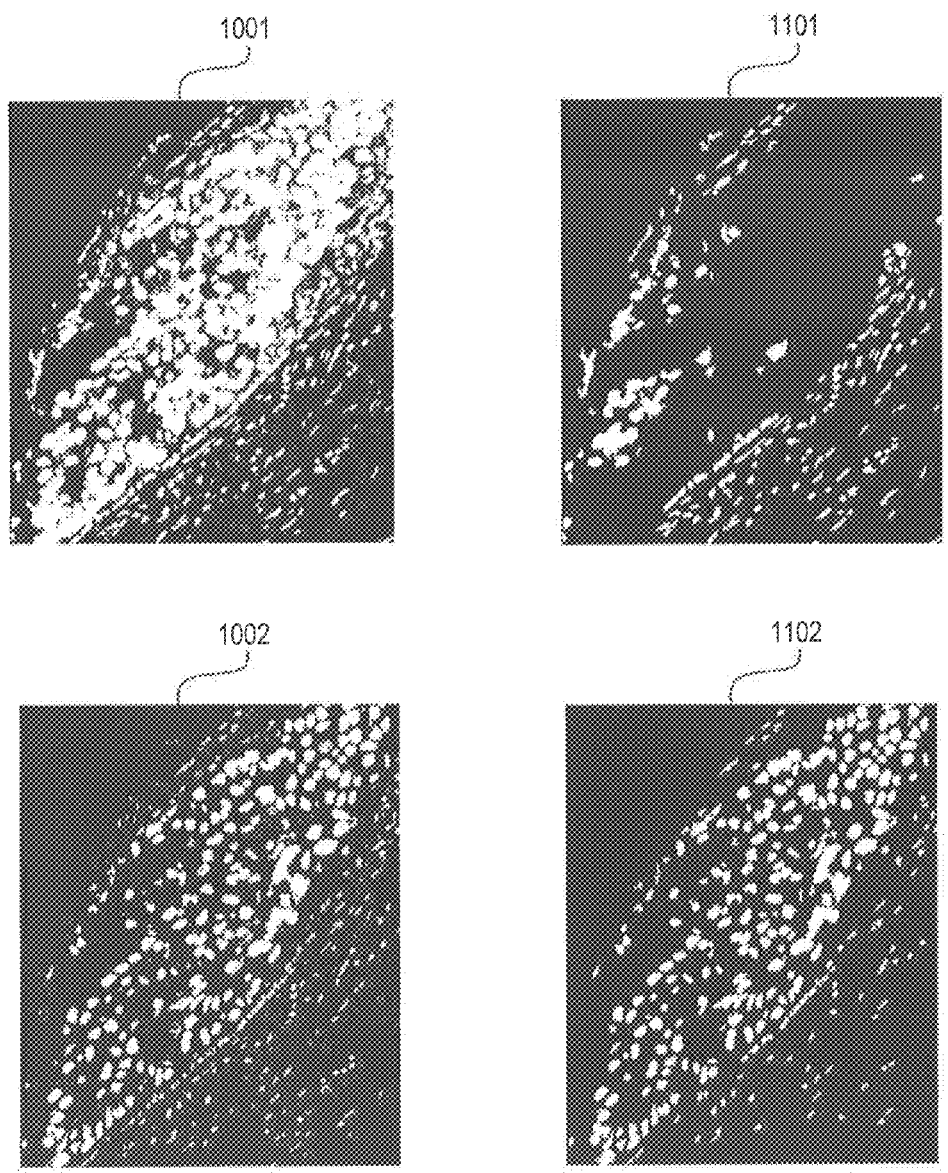
FIG. 11 illustrates a blob identification technique of an exemplary nuclear prospect selection step.
Figure 12:
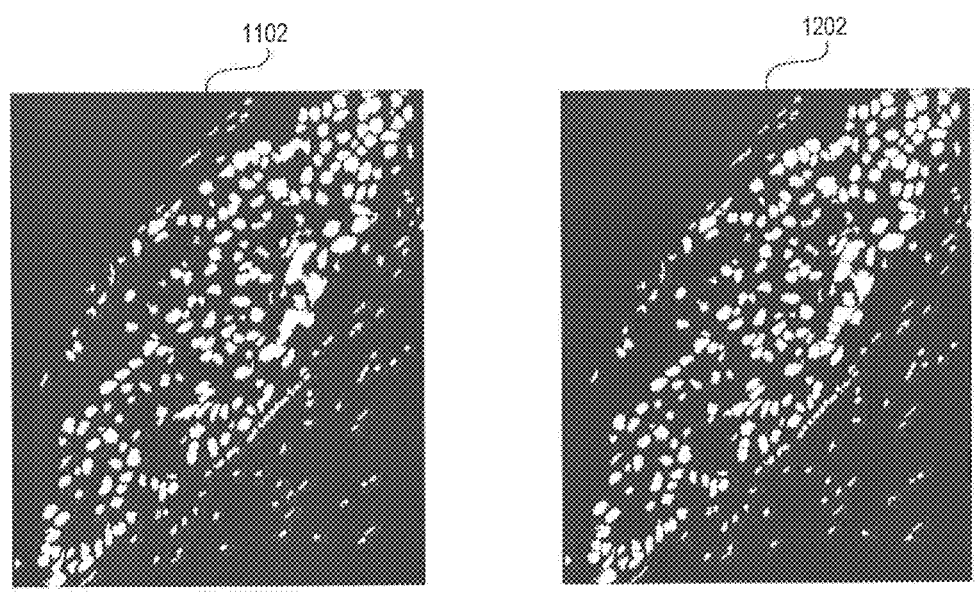
FIG. 12 illustrates a blob refinement technique of an exemplary nuclear prospect selection step.

After binary segmentation, nuclear prospect selection step 211 is performed to identify image blobs as nuclear prospects for further analysis. FIG. 11 and FIG. 12 illustrate an exemplary step 211. An image contour detection may be run on each of binary segment images 1001-1008. The identified contours may next be filtered, eliminating any contour not satisfying minimum and maximum area constraints to produce a series of filtered blob images. Minimum and maximum area constraints may be predetermined based on training image analysis or may be determined during processing, either manually or automatically based upon image characteristics. Filtered blob Images 1101 and 1102 illustrate contour detection and filtering performed on binary segment images 1001 and 1002, respectively. Next, a Euclidean distance map based watershed segmentation process may be performed on the filtered blob images to generate segmented images. FIG. 12 illustrates the sample application of such a segmentation process to filtered blob image 1102 to produce segmented image 1202. The watershed segmentation process may identify prospect nuclei that overlap, and separate these combined blobs between. As shown in segmented image 1202, this separation results in a black line between overlapping blobs. Finally, the remaining blobs after contour detection, filtering, and watershedding may be identified as nuclear prospects. In alternative embodiments, nuclear prospect selection step 211 may include alternative image analysis techniques for blob detection, including, for example, connected component analysis.

Returning again to FIG. 2, nucleus prospect measurement step 212 may be performed on each of the segmented images to analyze various features of the nucleus prospects, i.e. blobs, in each image. In exemplary embodiments, shape and color metrics may then be computed for each nucleus prospect. For example, shape metrics such as prospect perimeter, convex perimeter, and convexity score may be used. Convex perimeter may be computed as the total length of convex perimeter of a given prospect. Convexity score may be computed by dividing the convex perimeter by the prospect perimeter. Exemplary embodiments may also compute color metrics, such as mean Y', mean Cb, and mean Cr of each blob. Because each segmented image is a binary map having no color information, color information for each blob may be drawn from composite tissue image 604 by using the pixels of each blob as a mask. The shape and color metrics described herein represent exemplary metrics only, and additional or different nucleus analysis metrics may be used. In an initial prospect nucleus color filtering process, the color metrics of the prospect nuclei may be compared to a predetermined filtering rule set. Any prospect nuclei that do not meet the required parameters of the predetermined color filtering rule set may be eliminated. The color filtering rule set may be generated through automatic and manual image analysis of image training data.

Nuclear prospect graphing step 213 may then be applied to the identified nuclear prospects to generate a multi-level linked prospect graph. The prospect graph may include a number of levels corresponding to the number of levels remaining in compressed bit image 901. In the exemplary embodiment under discussion, this may include 8 levels. In the prospect graph, each identified nuclear prospect is linked to its parent prospects and its child prospects, in the levels above and below, respectively. Prospects are considered to have an overlapping parent/child relationship if their areas exceed an overlap threshold. The overlap threshold may be predetermined, and may be determined automatically or manually during process. In an exemplary embodiment, an overlap threshold of 10% may be used. Prospects may have multiple parents, for example, when two or more prospects separated at one level merge into a single prospect at a successive level. Prospects may have multiple children, for example, when a single prospect separates into multiple prospects at successive levels. The prospect graph generated in this step may be a complete map of all identified nuclear prospects at all levels and the links between them. In some embodiments, identified prospects may also be excluded from the graph based on predetermined rules.

The prospect graph may thus include multiple branches, each beginning with a parent prospect having no parent prospect of its own. These roots, i.e., the prospects with no immediate parents, may begin at the highest level of the graph, where none of the prospects have parent prospects. The root of a branch may also occur at lower levels of the graph, for example, if a nuclear prospect branch appears first at that level. In some cases, two or more branches may merge. Any prospect of the graph may be also considered a sub-root of all prospects descended from it, i.e., a sub-branch.

The results of nucleus prospect measurement step 212 and nuclear prospect graphing step 213 may then be combined in nuclear selection step 214. Nuclear selection step 214 may use the metrics computed in step 212 with the prospect graph of step 213 to determine an optimal selection of nuclei. In this step, each branch of the graph is traversed, beginning at the highest parent level and using a depth first traversal method. The depth first traversal method identifies and begins at the deepest level of the graph branch, where no prospects are linked to prospect children.

Each child prospect at the lowest level of the branch is compared to its parent in the next highest level to determine the superior nucleus candidate level. In cases where a child prospect has siblings, the sibling prospects as a group are compared to the parent prospect. One exemplary method of comparison may involve selecting the prospect or prospects with the highest weighted convexity score as the superior nucleus prospect level. A weighted convexity score may be computed by weighting the convexity score of each nuclear prospect on a level by its total perimeter. For example, where a child prospect at the lowest level of the graph has two sibling prospects, the weighted convexity of the three children may be computed based on the convexity score and area of each prospect. The weighted score of the three children is compared to that of the parent, and the prospect(s) having the higher weighted convexity score is determined to be a superior nuclear candidate. As the graph is traversed upwards, superior candidates are substituted for inferior candidates in future comparisons. Thus, if the weighted score of the sibling children prospects exceeds that of their parent, these sibling children prospects will be considered in place of their parent as the graph branch is traversed upwards. After comparisons are made at the lowest level, the graph branch is traversed upwards and a new set of comparisons are made, with each prospect at the new level being compared, along with its siblings, with its own parent at the next highest level. As discussed above, if a prospect at the new level was identified as an inferior candidate to its children, then the child prospects will replace it at this next level of comparison. When traversal of a branch is complete, at least one, and possibly several or many nuclear prospects will remain as selected nuclei.

As previously discussed, branches or sub-branches having distinct parent prospects may merge at subsequent levels of the graph. In such cases, if superior nuclear prospects have previously been identified in the merged-with branch, those nuclear prospects are used to represent sub-branch, and the sub-branch is not traversed a second time.

Figure 13A:
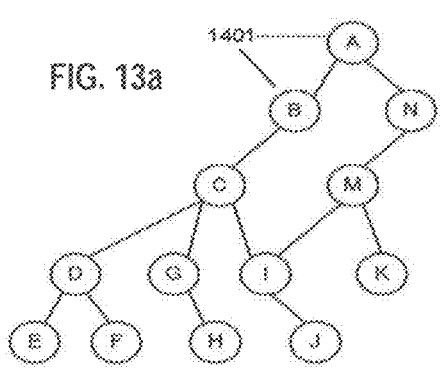
FIGS. 13a-d illustrate an exemplary graph traversal and nuclear selection step.
Figure 13C:
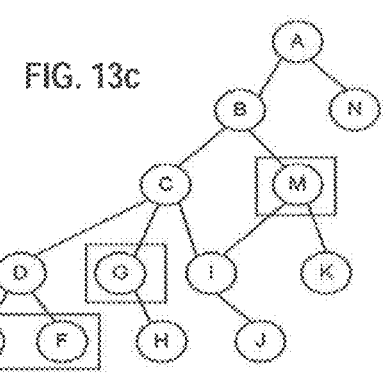
Figure 13B:
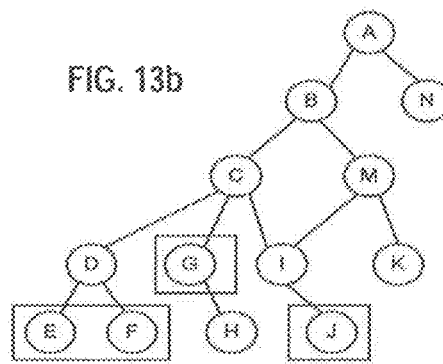

FIGS. 13a-d illustrates an example of the depth first travel traversal method of nuclear selection step 214 as follows. FIG. 13a illustrates an exemplary graph branch having five levels and fourteen nucleus prospects 1401, labeled prospects A-N. The traversal method of nuclear selection step 214 first moves to the deepest level of the graph branch, level 5, and begins with prospect E. The weighted convexity score of sibling prospects E and F are compared to that of their parent, prospect D. The prospect(s) with the higher score, in this example, prospects E and F are preliminarily selected as the superior prospects of the sub-branch rooted at prospect D. This selection is illustrated by a rectangle in FIG. 13b. The sub-branch rooted at prospect D must be compared to its parent, prospect C, but prospect C has other children that must be resolved first. Returning to the deepest level of the tree, prospect H is compared to prospect G. As shown in FIG. 13b, prospect G is selected as the superior prospect. In the last comparison at this level, prospect J is compared to prospect I, and prospect J is selected as the superior candidate. The traversal method, when evaluating the sub-branch rooted at prospect C ignores the additional parent of I, prospect M, and treats the branch as if each prospect has a single parent prospect.

When each set of level 5 prospect children in the sub-branch rooted at C have been compared to their respective parents, then the level 4 prospects are each compared to their parent, prospect C. Because prospects E and F were determined to be superior to prospect D, and prospect J superior to prospect I, they are used for the comparison with prospect C in place of their parent prospects. Thus, the weighted convexity scores of prospects E, F, G, and J are compared with that of prospect C. In this example, prospects E, F, G, and J remain selected as the superior candidates of that sub-branch. Moving up one level, the sub-branch rooted in prospect C must be compared to its parent, prospect B. The other child of prospect B, prospect M, has not yet been resolved, and must be resolved first.

FIG. 13c illustrates the resolution of the sub-branch rooted in prospect M. The weighted convexity scores of prospect K and prospect J are compared to that of prospect M. Because the sub-branch rooted in prospect I has already been resolved, with prospect J as the superior candidate, the selection method accepts the previous selection and does not traverse that sub-branch a second time. FIG. 13c illustrates prospect M being selected as a superior prospect to prospects J and K.

With the sub-branches rooted in prospects C and M resolved, prospect B can be compared to its children. Here, the weighted convexity score of prospects E, F, G, and M are compared to the score of prospect B. Prospects E, F, G, and M are selected as superior to prospect B and remain selected.

Figure 13D:
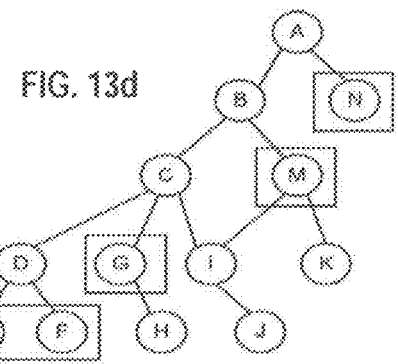

Finally, the graph branch rooted in prospect A may be resolved by comparing the weighted convexity scores of prospects E, F, G, M, and N to their parent prospect A. FIG. 13d illustrates the selection of prospects E, F, G, M, and N as superior to prospect A. Prospects E, F, G, M, and N are thus designated as selected nuclei.

The traversal method is repeated for all branches of the nuclear prospect graph until a set of selected nuclei is determined. The selected nuclei are then output to overlap removal step 215. Because the selected nuclei may be selected from different levels of compressed bit image 901, it is possible for some selected nuclei to have pixels in common with other selected nuclei. That is, selected nuclei may overlap with other selected nuclei. Overlap removal step 215 receives selected nuclei from nuclear selection step 214, separates any overlapping nuclei, and outputs a set of final selected nuclei.

Figure 14:
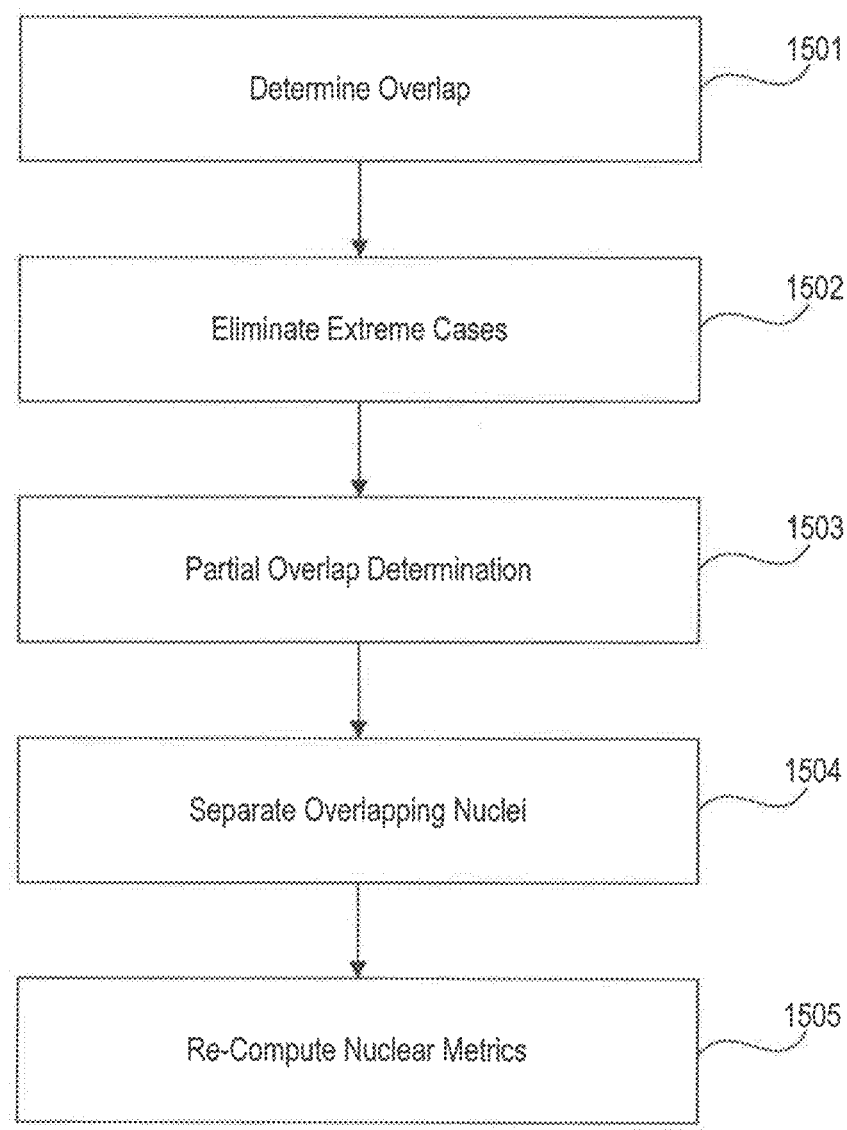
FIG. 14 depicts a flowchart illustrating the steps of an overlap removal method.

Overlap removal step 215 may proceed as follows, with reference to FIG. 14. Overlap determination step 1501 may begin the overlap removal by determining occurrences of overlap among selected nuclei. Overlap between selected nuclei may be determined by any suitable means. For example, overlap may be determined by comparing the pixels contained in each nuclei to that of every other nuclei to find those that share pixels. In other embodiments, the pixels in each nuclei may be compared only to those of nearby nuclei. In another exemplary embodiment, a bounding rectangle, e.g. the smallest rectangle that can contain a selected nuclei, for each nucleus may be compared to bounding rectangles of other nuclei. Overlap of bounding rectangles may be considered to be overlap of nuclei. Alternative methods for determining overlap may also be used. Because all nuclei at a given level of compressed bit image 901 were separated at nuclear selection step 211, detected overlapping nuclei necessarily must be on different levels. For the purpose of discussion, the higher level nucleus will be referred to as an upper nucleus and the lower level nucleus will be referred to as a lower nucleus. Once overlap between two selected nuclei is determined, it must be resolved. Overlap determination step 1501 may operate by identifying all overlapping nuclei before proceeding to resolution steps 1502-1505, or may resolve each overlap as it is detected. The following steps 1502-1505 will be described as they relate to a single upper/lower nuclei overlap, but, like overlap determination step 1501, may also be performed for all identified overlaps before proceeding to the next step or for may process each overlap to completion before processing or identifying the next overlap.

Extreme overlap elimination step 1502 begins the resolution of overlapping selecting nuclei by eliminating nuclei showing extreme overlap. An AND operation is performed on the upper and lower nuclei to identify the overlap area, and the overlap area is computed. If half of either the upper nucleus area or the lower nucleus area is less than that of the overlap area, than it that nucleus is removed from the selected nuclei list. If both the upper and lower nuclei meet this criteria, than the smaller of the nuclei is removed from the selected nuclei list. Extreme overlap elimination step 1502 serves to remove all nuclei that are greater than 50% contained in another nucleus. If both blobs remain after extreme overlap determination step 1502, than partial overlap determination step 1503 is performed on the partially overlapping nuclei.

In partial overlap determination step 1503, a starting point on the contour of the lower nucleus outside of the overlap region is chosen. The location of the starting point may be any point on the contour outside of the overlap region. The contour of the lower nucleus is then traversed until it enters the region of overlap, i.e. the pixel on the lower nucleus contour is also contained within the upper nucleus. The start of the overlap region is recorded. Traversal continues around the entire contour until the last point of overlap is detected. This point is recorded as the end of the overlap region. In some cases, a traversal of the lower nucleus contour will enter and exit the overlap region more than once. Using the last point of overlap as the end of the overlap region serves to ensure that the entire overlap region is identified between the determined start and end of the overlap region. During traversal, pixels neighboring those of the lower nucleus contour may also be analyzed for overlap with the upper nucleus to designate the start or end of an overlap region. It may be necessary to analyze neighboring pixels because cases may occur where upper and lower nuclei have contours that border one another but never actually cross. Such nuclei may still be considered to be overlapping and require resolution by eliminating the border region.

After determination of the overlap region, nuclei separation step 1504 is performed to eliminate the overlapping region. In nuclei separation step 1504, pixels in the overlapping region are removed from both upper and lower nuclei. Finally, in recomputation step 1505, the areas of remaining portions of the upper and lower nuclei are determined. These areas are compared to the minimum area constraints used in nuclear selection step 211. Any of the remaining nuclei that fail to meet the minimum area constraints may be eliminated. After the elimination of extreme overlap cases at step 1502, the removal of overlapping nuclei regions at step 1504, and the elimination of nuclei not meeting a minimum area constraint at step 1505, a list of final selected nuclei remains.

Figure 15:
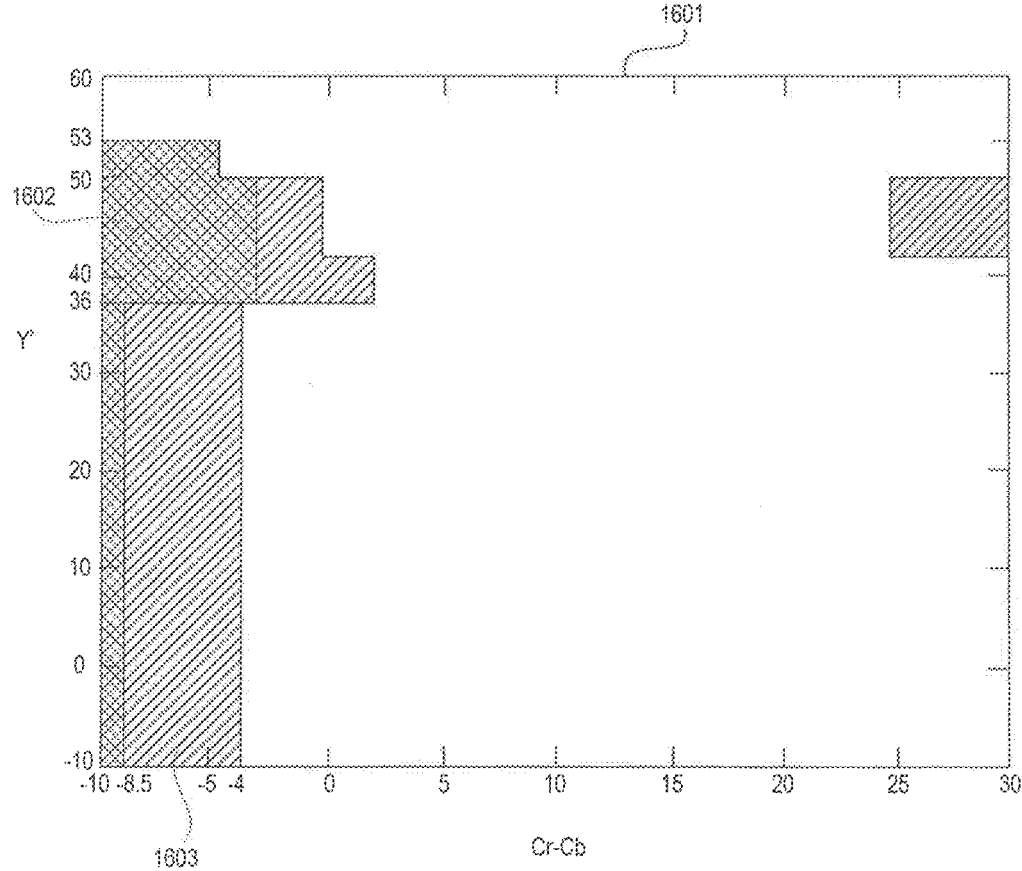
FIG. 15 illustrates an exemplary predetermined rule set for classifying selected nuclei.

Nuclei classification step 216 may next be performed to classify the final selected nuclei as blue or brown. Selected nuclei designated as brown may be classified as ER-PR positive. Nuclei designated as blue may be designated as ER-PR negative. A classification rule set may be applied to the color metrics of each selected nuclei in order to classify it. A classification rule set may be predetermined based on analysis of image training data. FIG. 15 illustrates an exemplary predetermined rule set. The x-axis of the represents the value obtained by subtracting the mean Cb value from the mean Cr value of each selected nucleus. The y-axis represents the mean Y' value of each selected nucleus. The cross-hatched boxes represent the designation of each nucleus based on its average color channel values. Area 1601 represents nuclei designated as brown, area 1602 represents nuclei designated as blue, and areas 1603 represent falsely identified nuclei to be excluded from further analysis. In the illustration, the Y' values of the y-axis extend below zero. This axis represents the Y' value of each pixel minus the predetermined thresholding value used at separation step 205.

Returning again to FIG. 2, regional scoring step 217 may be performed to determine intensity and proportion scores for the analysis region. A predetermined model may be used to compute a nuclear intensity score based on the average brown intensity of all nuclei classified as positive in nucleus classification step 216. A data mining exercise may be used to compute a nuclear intensity scoring model. In an exemplary embodiment, brown nuclear intensities for a broad range of slides were compared to pathologist produced ER-PR intensity scores to determine an appropriate nuclear intensity scoring model. The predetermined model may be specific to a particular staining kit and protocol. Regional scoring step 217 may also compute a percent positivity score by computing the total percentage of positive nuclei identified in nuclear classification step 216.

Finally, at output step 218, the regional analysis method 200 may output the intensity score, percent positivity score, an overlay mask of the selected nuclei, and the information about the positivity classification and mean intensity of each selected nuclei to the remaining steps in the slide analysis method 100. Returning now to FIG. 1, slide analysis method 100 may receive outputs from regional analysis method 200 at input step 101.

Slide positivity step 102 may receive the information from input step 101 and compute a percent positivity score for the entire slide as the total of all positive nuclei divided by the sum of all nuclei, across all analysis regions.

Slide average intensity step 103 next computes the weighted average DAB intensity of the slide. The weighted average brown intensity score for each analysis region is computed based on a weighting by the area of the nuclei contained in the region.

Next, slide average scoring step 104 computes the weighted average of the diagnostic scores of each analysis region to determine an average slide score. Each analysis region may be assigned a diagnostic score (0, 1, 2, and 3) based on its average brown intensity and positivity scores. Next, the slide percentage of 0, 1, 2, and 3 scores may be computed based on the scores of each analysis region, weighted by the number of nuclei in each analysis region.

Score mapping step 105 may then correlate the slide percent positivity score from step 102 and the slide average DAB intensity score from step 103 to compute a proportion score for the slide and an intensity score for the slide, based on predetermined correlations.

Next, overall slide scoring step 106 may compute final diagnostic scores for the slide. A final H score for the slide may be determined based on the results of slide average scoring step 104. A final Allred score for the slide may be computed based on the proportion and intensity scores of score mapping step 105. Allred score and H score are standard methods of scoring slides for ER-PR results.

Finally, diagnosis step 107 may map the computed H score and the computed Allred score from the slide to determine a final diagnostic result for the slide.

Embodiments of the methods disclosed herein may serve to reduce analysis time or reduce the computing resources required to perform these analyses. The methods disclosed herein utilize several predetermined parameters and thresholds, computed specifically to work with particular staining kits and protocols. By using predetermined parameters and thresholds, and by performing certain estimations during processing, the exemplary methods and techniques described herein eliminate the need for certain time consuming analysis techniques. For example, conventional techniques may utilize various feature extraction or blob recognition techniques to identify each candidate nucleus within an analysis region, and then use additional analysis techniques in conjunction with the identified nuclei to confirm its nuclear status. This type of analysis may be time consuming and resource intensive as it identifies and localizes various tissue structures within a cell. Inventive methods and techniques disclosed herein recognize novel techniques for identifying and confirming prospect nuclei.

Embodiments of the methods and techniques disclosed herein may be implemented as instructions to be carried out by at least one processor. As used herein, the term "processor" may include an electric circuit that performs a logic operation on an input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations. The at least one processor may be configured to perform an action if it is provided with access to, is programmed with, includes, or is otherwise made capable carrying out instructions for performing the action. The at least one processor may be provided with such instructions either directly through information permanently or temporarily maintained in the processor, or through instructions accessed by or provided to the processor. Instructions provided to the processor may be provided in the form of a computer program comprising instructions tangibly embodied on an information carrier, e.g., in a machine-readable storage device, or any tangible computer-readable medium. A computer program may be written in any form of programming language, including compiled or interpreted languages, and it can be deployed in any form, including as a standalone program or as one or more modules, components, subroutines, or other unit suitable for use in a computing environment. The at least one processor may include specialized hardware, general hardware, or a combination of both to execute related instructions. The processor may also include an integrated communications interface, or a communications interface may be included separate and apart from the processor. The at least one processor may be configured to perform a specified function through a connection to a memory location or storage device in which instructions to perform that function are stored.

The foregoing methods and systems have been described in relation to particular embodiments which are intended in all respects to be illustrative rather than restrictive. Those skilled in the art will appreciate that many different combinations of hardware will be suitable for practicing the present invention.

From the foregoing description, it will be appreciated that the methods and apparatus described herein to score digital pathology images of stained slides may be adapted to score any digital pathology images, and not only those described with respect to particular embodiments. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for analyzing a digital pathology image comprising:
   selecting at least one analysis region in the digital pathology image;
   separating the at least one analysis region into a tissue region and a background region using a predetermined separation threshold;
   identifying a plurality of nuclear prospects within the tissue region, wherein identifying the plurality of nuclear prospects includes:
      calculating a principal component projection of the tissue region,
      segmenting the tissue region of the digital pathology image into a plurality of image layers via a spectral hashing function, and
      determining the plurality of nuclear prospects from among the plurality of layers;
   selecting nuclei from among the identified nuclear prospects, wherein selecting nuclei includes:
      generating a hierarchical connected graph associating at least a first one of the plurality of nuclear prospects on a first segmented layer of the digital image with at least a second one of the plurality of nuclear prospects on a second segmented layer of the digital image, comparing the first one of the nuclear prospects to the second one of the nuclear prospects to identify a superior nuclear prospect, and designating the superior nuclear prospect as a selected nuclei; and generating a diagnostic score of the at least one analysis region based on the selected nuclei.

2. The method according to claim 1, wherein generating a diagnostic score includes scoring the analysis region based on color metrics of the selected nuclei.

3. The method according to claim 1, wherein comparing the first one of the nuclear prospects and the second one of the nuclear prospects includes identifying the nuclear prospect having a higher convexity score.

4. The method according to claim 1, wherein the at least one analysis region includes the entire digital pathology image.

5. The method according to claim 1, wherein the at least one analysis region includes a plurality of analysis regions, the method further comprising:

generating a combined diagnostic score based on the diagnostic scores of the plurality of analysis regions.

6. A method for analyzing a digital pathology image comprising:

selecting an analysis region of the digital pathology image;

separating a tissue region and a background region in the analysis region of the digital pathology image using a predetermined separation threshold;

identifying a plurality of nuclear prospects within the tissue region;

selecting a portion of nuclei from among the plurality of identified nuclear prospects, wherein selecting the portion of nuclei includes:

generating a hierarchical connected graph associating at least a first one of the plurality of nuclear prospects on a first segmented layer of the digital image with at least a second one of the plurality of nuclear prospects on a second segmented layer of the digital image, comparing the first one of the nuclear prospects to the second one of the nuclear prospects to identify a superior nuclear prospect, wherein comparing the first one of the nuclear prospects and the second one of the nuclear prospects includes identifying the nuclear prospect having a higher convexity score, and designating the superior nuclear prospect as a selected nuclei;

generating a diagnostic score of the analysis region based on the selected nuclei, wherein generating the diagnostic score includes scoring the analysis region based on color metrics of the selected nuclei.

7. The method according to claim 6, wherein identifying a plurality of nuclear prospects includes:

calculating a principal component projection of the tissue region;

segmenting the tissue region of the digital pathology image into a plurality of image layers via a spectral hashing function; and determining the plurality of nuclear prospects from among the plurality of layers.

8. The method according to claim 6, wherein the at least one analysis region includes the entire digital pathology image.

9. The method according to claim 6, wherein the at least one analysis region includes a plurality of analysis regions, the method further comprising:

generating a combined diagnostic score based on the diagnostic scores of the plurality of analysis regions.

10. A system for analyzing a digital pathology image comprising:

a non-transitory computer readable medium comprising instructions;

at least one processor configured to carry out the instructions to:

select at least one analysis region in the digital pathology image;

separate the at least one analysis region into a tissue region and a background region using a predetermined separation threshold;

identify a plurality of nuclear prospects within the tissue region, wherein identifying the plurality of nuclear prospects includes:

calculating a principal component projection of the tissue region, segmenting the tissue region of the digital pathology image into a plurality of image layers via a spectral hashing function, and determining the plurality of nuclear prospects from among the plurality of layers;

select nuclei from among the identified nuclear prospects, wherein selecting the nuclei includes:

generating a hierarchical connected graph associating at least a first one of the plurality of nuclear prospects on a first segmented layer of the digital image with at least a second one of the plurality of nuclear prospects on a second segmented layer of the digital image, comparing the first one of the nuclear prospects to the second one of the nuclear prospects to identify a superior nuclear prospect, and designating the superior nuclear prospect as a selected nuclei; and generate a diagnostic score of the at least one analysis region based on the selected nuclei.

11. The system according to claim 10, wherein generating a diagnostic score includes scoring the analysis region based on color metrics of the selected nuclei.

12. The system according to claim 10, wherein the instructions to compare the compare the first one of the nuclear prospects and the second one of the nuclear prospects further include instructions to identify the nuclear prospect having a higher convexity score.

13. The system according to claim 10, wherein the at least one analysis region includes the entire digital pathology image.

14. The system according to claim 10, wherein the at least one analysis region includes a plurality of analysis regions, and the instructions further comprise instructions to:

generate a combined diagnostic score based on the diagnostic scores of the plurality of analysis regions.

15. A system for analyzing a digital pathology image comprising:

a non-transitory computer readable medium comprising instructions;

at least one processor configured to carry out the instructions to:

select an analysis region of the digital pathology image;

separate a tissue region and a background region in the analysis region of the digital pathology image using a predetermined separation threshold;

identify a plurality of nuclear prospects within the tissue region;

select a portion of nuclei from among the plurality of identified nuclear prospects, wherein selecting the portion of nuclei includes:

generate a hierarchical connected graph associating at least a first one of the plurality of nuclear prospects on a first segmented layer of the digital image with at least a second one of the plurality of nuclear prospects on a second segmented layer of the digital image, compare the first one of the nuclear prospects to the second one of the nuclear prospects to identify a superior nuclear prospect, wherein comparing the first one of the nuclear prospects and the second one of the nuclear prospects includes identifying the nuclear prospect having a higher convexity score, and designate the superior nuclear prospect as a selected nuclei;

generate a diagnostic score of the analysis region based on the selected nuclei.

16. The system according to claim 15, wherein the instructions to identify a plurality of nuclear prospects further include instructions to:

calculate a principal component projection of the tissue region;

segment the tissue region of the digital pathology image into a plurality of image layers via a spectral hashing function; and determine the plurality of nuclear prospects from among the plurality of layers.

17. The system according to claim 15, wherein generating a diagnostic score includes scoring the analysis region based on color metrics of the selected nuclei.

18. The system according to claim 15, wherein the at least one analysis region includes the entire digital pathology image.

19. The system according to claim 15, wherein the at least one analysis region includes a plurality of analysis regions, and the instructions further comprise instructions to:

generate a combined diagnostic score based on the diagnostic scores of the plurality of analysis regions.

* * * * *

UNITED STATES PATENT AND TRADEMARK OFFICE
CERTIFICATE OF CORRECTION

PATENT NO. : 9,852,354 B2
APPLICATION NO. : 14/701816
DATED : December 26, 2017
INVENTOR(S) : Rohit Jain et al.

Page 1 of 1

It is certified that error appears in the above-identified patent and that said Letters Patent is hereby corrected as shown below:

In the Specification

In Column 2, Line 39, delete "FIG. 3." and insert -- FIG. 3 --, therefor.

In Column 3, Line 5, delete "diaminobenzadine" and insert -- diaminobenzidine --, therefor.

In Column 5, Line 46, delete "FIG. 3." and insert -- FIG. 3 --, therefor.

In Column 6, Line 52, delete "$G'_D)$" and insert -- $G''_D)$ --, therefor.

In Column 6, Line 54, delete "$C'R$" and insert -- $C'_R$ --, therefor.

In Column 6, Line 54, delete "$(0.4186688 \cdot G'_D)$" and insert -- $(0.418688 \cdot G''_D)$ --, therefor.

In Column 9, Line 39, delete "2"5," and insert -- 2^5, --, therefor.

In the Claims

In Column 20, Line 46, in Claim 12, delete "compare the compare the" and insert -- compare the --, therefor.

Signed and Sealed this
Eighteenth Day of June, 2019

Andrei Iancu
*Director of the United States Patent and Trademark Office*